(12) United States Patent
Cappiello et al.

(10) Patent No.: US 11,092,579 B2
(45) Date of Patent: Aug. 17, 2021

(54) MACHINE FOR CHEMICAL ANALYSIS COMPRISING THE COMBINATION OF ELECTRON IONIZATION MASS SPECTROMETRY WITH LIQUID CHROMATOGRAPHY

(71) Applicants: Achille Cappiello, Rome (IT); Giorgio Famiglini, Pesaro (IT); Veronica Termopoli, Rimini (IT); Maurizio Piergiovanni, Urbino (IT)

(72) Inventors: Achille Cappiello, Rome (IT); Giorgio Famiglini, Pesaro (IT); Veronica Termopoli, Rimini (IT); Maurizio Piergiovanni, Urbino (IT)

(73) Assignees: Archille Cappiello; Giorgio Famiglini; Veronica Termopoli; Maurizio Piergiovanni

( * ) Notice: Subject to any disclaimer, the term of this patent is extended or adjusted under 35 U.S.C. 154(b) by 0 days.

(21) Appl. No.: 16/755,332

(22) PCT Filed: Oct. 15, 2018

(86) PCT No.: PCT/IB2018/057970
§ 371 (c)(1),
(2) Date: Apr. 10, 2020

(87) PCT Pub. No.: WO2019/073458
PCT Pub. Date: Apr. 18, 2019

(65) Prior Publication Data
US 2020/0300822 A1     Sep. 24, 2020

(30) Foreign Application Priority Data
Oct. 13, 2017   (IT) .................. 102017000115527

(51) Int. Cl.
*G01N 30/72*  (2006.01)
*G01N 30/30*  (2006.01)
(Continued)

(52) U.S. Cl.
CPC ......... *G01N 30/7233* (2013.01); *G01N 30/30* (2013.01); *H01J 49/0431* (2013.01); *H01J 49/0468* (2013.01); *G01N 2030/027* (2013.01)

(58) Field of Classification Search
CPC ............. G01N 30/30; G01N 2030/027; G01N 2030/3038; G01N 2030/3053;
(Continued)

(56) References Cited

U.S. PATENT DOCUMENTS

| 2009/0101814 A1* | 4/2009 | Amirav | H01J 49/0431 |
| | | | 250/288 |
| 2011/0049031 A1* | 3/2011 | Cappiello | G01N 30/32 |
| | | | 210/198.2 |

(Continued)

FOREIGN PATENT DOCUMENTS

| WO | 2001/033605 | 5/2001 |
| WO | 2005/062883 | 7/2005 |
| WO | 2011/081352 | 7/2011 |

OTHER PUBLICATIONS

International Search Report and Written Opinion corresponding to International Patent Application No. PCT/IB2018/057970, dated Feb. 27, 2019.
(Continued)

*Primary Examiner* — David A Vanore
(74) *Attorney, Agent, or Firm* — McAndrews, Held & Malloy, Ltd.

(57) ABSTRACT

A chemical analysis machine comprising a liquid phase chromatograph comprising, in turn, a chromatography nano-column with an inner diameter that is smaller than or equal
(Continued)

to 100 μm, a mass spectrometer with an electronic ionization source, and a joining assembly interposed between the liquid phase chromatograph and the mass spectrometer. The joining assembly comprises a microcapillary tube having an inner diameter smaller than or equal to 50 μm and having a first end, which is directly connected to an outlet end of the nano-column so as to receive the liquid phase, and a second end, which is housed inside a vaporization microcannula where an inert gas flows. The vaporization microcannula is partially engaged by the microcapillary tube and has an end facing the inside of an ionization chamber of the mass spectrometer. The vaporization microcannula is subdivided into a first part, which is subjected to the action of a heating device, and a second part, which is kept at room temperature and has a length that is greater than or equal to 2 cm. The microcapillary tube occupies the inside of the entire second part of the vaporization microcannula and has an end portion that is arranged inside the first part and has a length that is less than or equal to 5 mm.

3 Claims, 1 Drawing Sheet

(51) Int. Cl.
*H01J 49/04* (2006.01)
*G01N 30/02* (2006.01)

(58) Field of Classification Search
CPC ....... G01N 2030/324; G01N 2030/847; G01N 2030/8476; G01N 30/10; G01N 30/32; G01N 30/34; G01N 30/38; G01N 30/7206; G01N 30/7233; G01N 30/7246; G01N 30/7253; H01J 49/0431; H01J 49/0468; H01J 49/0404; H01J 49/0445; H01J 49/105
USPC .................................................. 250/282, 288
See application file for complete search history.

(56) References Cited

U.S. PATENT DOCUMENTS

2017/0184552 A1\* 6/2017 Guzzonato .......... H01J 49/0468
2020/0300822 A1\* 9/2020 Cappiello .............. G01N 30/30

OTHER PUBLICATIONS

Niessen W M A et al: "Strategies in developing interfaces for coupling liquid chromatography and mass spectrometry", Journal of Chromatography A, Elsevier, Amsterdam, NL, vol. 554, No. 1-2, Aug. 21, 1991 (Aug. 21, 1991), pp. 3-26, XP028884581, ISSN: 0021-9673, 001: 10.1016/S8021-9673(01)88433-8 [retrieved on 1991-88-21] figure 2d.

\* cited by examiner

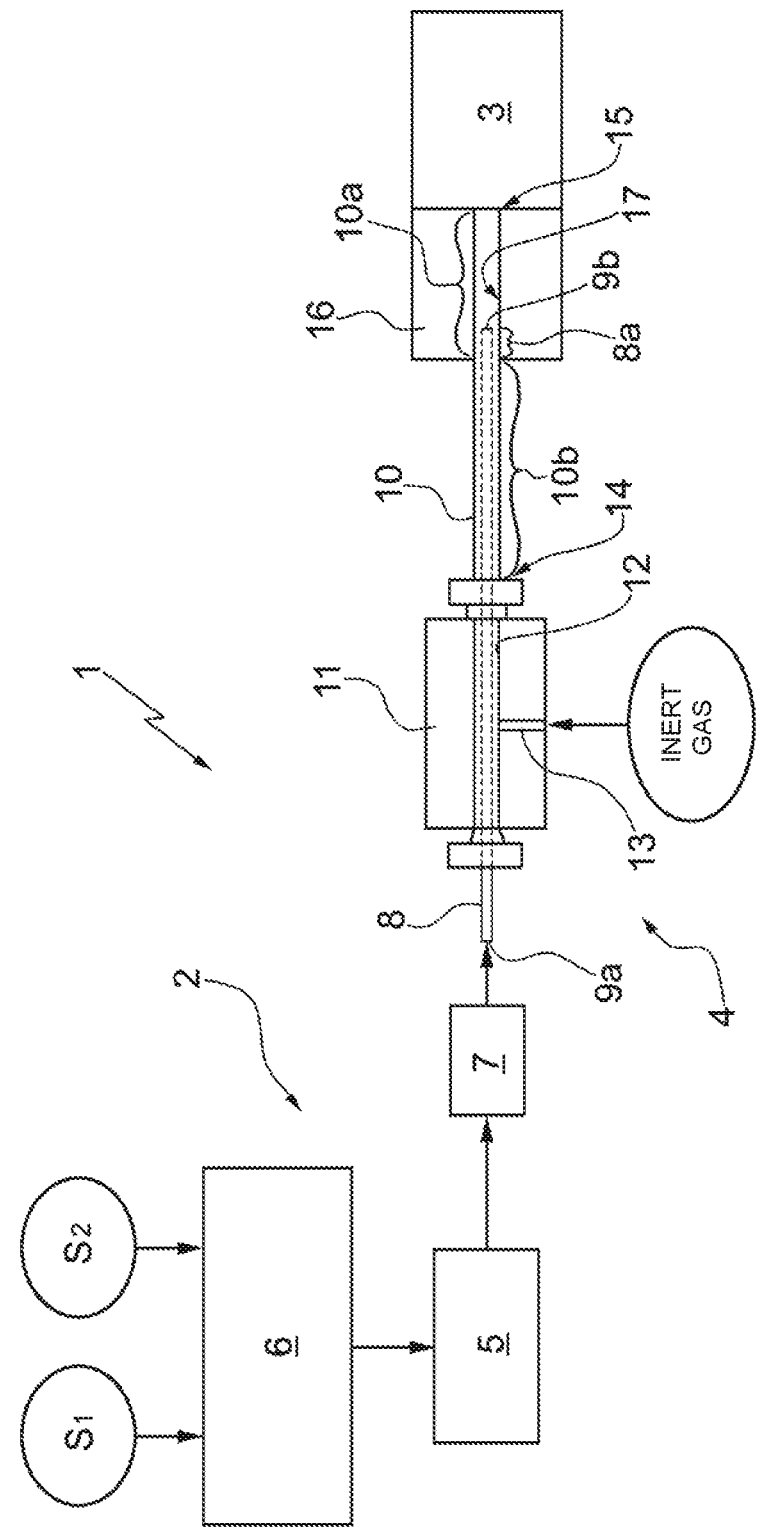

MACHINE FOR CHEMICAL ANALYSIS COMPRISING THE COMBINATION OF ELECTRON IONIZATION MASS SPECTROMETRY WITH LIQUID CHROMATOGRAPHY

CROSS-REFERENCE TO RELATED APPLICATIONS

The present application is filed pursuant to 35 U.S.C. 371 as a U.S. National Phase application of International Application No. PCT/IB2018/057970, which was filed on Oct. 15, 2018, and claims priority from Italian Patent Application No. 102017000115527 filed on Oct. 13, 2017. The entire texts of the aforementioned applications are incorporated by reference in their entirety.

TECHNICAL FIELD

The present invention relates to a machine for chemical analysis comprising mass spectrometry means combined with liquid chromatography means. In particular, the invention is centred on the interface between liquid chromatography and electronic ionization mass spectrometry.

BACKGROUND ART

In the field of chemical analysis, the possibility of using the combination of chromatography with mass spectrometry has long been known. In this way, it is possible to separate the compounds present in samples by means of chromatography and then detect them by means of mass spectrometry.

The chromatography technique most widely used in combination with mass spectrometry is gas chromatography. In fact, as will appear obvious to an expert in the field, the possibility of having compounds already in a gaseous state at the outlet of the chromatography column necessarily gives a big advantage.

However, the use of gas chromatography in this application entails all the limitations regarding gas chromatography. In fact, gas chromatography can only be applied to particularly volatile and thermostable molecules.

From the above, it is obvious that use of liquid chromatography in combination with electronic ionization mass spectrometry would instead constitute an enormous application advantage, as it would significantly reduce the limitations regarding the types of compounds that can be analysed. As is known to experts in the field, such an advantage would have extremely important implications, especially for safety in the food, forensics and environmental fields.

The difficulties related to the combination of liquid chromatography with mass spectrometry mainly concern the need to convert the liquid phase leaving the chromatography column to the gas phase before it enters the ionization chamber of the mass spectrometer. In addition, it should be considered that, in general, liquid phase chromatography envisages the use of a significant quantity of mobile phase that, once converted to the gaseous state and introduced inside the ionization chamber, might impair the high vacuum levels at which the ionization chamber must work. To solve the above problem, it is necessary to remove part of the liquid phase before it reaches the mass spectrometer. However, such a tactic, even if it ensures not altering the vacuum levels in the ionization chamber, entails both the problem of having to provide a device for removing part of the liquid phase leaving the chromatography column and the problem of compromising the precision of the analysis from the quantitative viewpoint.

WO2011/081352A2 describes an innovative electrospray ionization device as the interface between an HPLC instrument and a mass spectrometer. As is known, electrospray ionization is a technique used in mass spectrometry to produce ions using an electrospray, where high voltage is applied to a liquid to create an aerosol. This technique is particularly useful in the production of ions from macromolecules, because it overcomes the propensity of these molecules to fragment when ionized. In addition to the drawback of requiring instrumentation that ensures an appropriate voltage, such a technique also has the limitation of achieving a mass spectrum from which little structural information can be obtained. In other words, although it is also capable of ionizing macromolecules of high molecular weight, the device described in WO2011/081352A2 nevertheless produces a rather unsatisfactory mass spectrum in terms of structural information.

There was therefore awareness of the need for a solution that made the combination of liquid chromatography with electronic ionization mass spectrometry feasible, whilst avoiding the problems of the known art. In particular, there was awareness of the need to provide vaporization of volatile or semi-volatile molecules originating from liquid chromatography and then ionize them via electronic ionization to consequently obtain a mass spectrum rich in highly informative fragments useful for the identification of analytes.

DISCLOSURE OF INVENTION

The subject of the present invention is a machine for chemical analysis comprising the combination of liquid chromatography with mass spectrometry, the essential characteristics of which are set forth in claim 1, and the preferred and/or auxiliary characteristics of which are set forth in claims 2 and 3.

BRIEF DESCRIPTION OF THE DRAWINGS

An embodiment is described below, purely by way of non-limitative example, with the aid of the accompanying drawing, which shows the machine for chemical analysis forming the subject matter of the present invention in an extremely schematic manner.

BEST MODE FOR CARRYING OUT THE INVENTION

In the FIGURE, the chemical analysis machine according to the present invention is indicated, as a whole, by reference numeral 1.

The machine 1 comprises a liquid phase chromatograph 2, an electronic ionization mass spectrometer 3 and a joining assembly 4 interposed between the liquid phase chromatograph 2 and the electronic ionization mass spectrometer 3.

The liquid phase chromatograph 2 comprises an injector device 5, into which both the sample to be analysed and one or more liquid solvents S1 and S2 flow through the action of a nano-pump 6, and a nano-column 7 connected to the injector device 5, from which it receives the solvents with the dissolved sample and inside which the separation of the compounds forming the sample takes place.

Here and in the following, by the term nano-columns we mean chromatography columns with an internal diameter of less than 100 μm.

The joining assembly 4 comprises a microcapillary tube 8 having an inner diameter of approximately 30 μm and having a first end 9a directly connected to an outlet end of the nano-column 7 to receive the liquid phase, and a second end 9b housed inside a vaporization microcannula 10, as shall be described further on.

The joining assembly 4 comprises a T-shaped device 11, which incorporates a longitudinal channel 12, the ends of which both face onto the outside of the T-shaped device 11 and, in use, through which the microcapillary tube 8 passes, and a transverse channel 13, with a first end facing onto the outside of the T-shaped device 11 and a second end facing onto the longitudinal channel 12. In use, the transverse channel 13 serves to introduce an inert gas, for example He, inside the longitudinal channel 12.

As revealed above, the joining assembly 4 comprises a vaporization microcannula 10, which has a first end 14 connected in a fluid-tight manner with one end of the longitudinal channel 12 and a second end 15 facing inside an ionization chamber (known and not described in detail for simplicity) of the electronic ionization mass spectrometer 3.

The vaporization microcannula 10 is preferably made of fused silica or ceramic. This choice is dictated by the fact that the vaporization microcannula 10 must be made of a material with high chemical inertness (e.g. ceramic, deactivated fused silica, etc.) in order to reduce possible thermal decomposition and favour rapid vaporization of the sample.

Part of the vaporization microcannula 10 houses the microcapillary tube 8. Summarizing the above, the microcapillary tube 8 extends from the outlet end of the chromatography nano-column 7 up to the inside of the vaporization microcannula 10 where it can end in different positions (terminating in end 9b), after having passed through the entire longitudinal channel 12 of the T-shaped device 11.

A part 10a of the vaporization microcannula 10 is subjected to the action of a heater 16. In particular, the heater 16 has a cylindrical structure, in which a central channel 17 is provided and in which the part 10a of the vaporization microcannula 10 is housed. The part 10a of the vaporization microcannula 10 is heated to a temperature ranging between 200 and 400° C. in order to bring the liquid phase and the analytes dissolved therein to the gaseous state, which will then be introduced inside the ionization chamber of the mass spectrometer. The vaporization temperature must be modifiable within the above-indicated range as not all molecules have the same vaporization temperature.

Furthermore, temperatures that are too high can degrade the structure of molecules that are particularly thermolabile, while temperatures that are too low prevent the vaporization of molecules that need greater heating.

In use, once the liquid phase leaves the chromatography nano-column 7, it is conveyed inside the microcapillary tube 8 and then emerges in the gaseous phase inside the vaporization microcannula 10, where it mixes with the inert gas previously introduced inside the T-shaped device 11. Basically, once the inert gas is introduced inside the T-shaped device 11, it is conveyed inside the vaporization microcannula 10 where it flows and distributes itself around the microcapillary tube 8 until it mixes with the liquid phase and the analytes dissolved therein at the end 9b of the microcapillary tube 8.

The inventors of the present invention have found that in order for the machine for chemical analysis forming the subject matter of the present invention to operate effectively, geometrical requirements regarding the relative position of the microcapillary tube 8 with respect to the part 10a of the vaporization microcannula 10 subjected to the action of the cylindrical heater 16 must be respected.

In particular, the inventors of the present invention have verified that the section 10b of the vaporization microcannula running between the T-shaped device 11 and the part 10a subjected to the action of the cylindrical heater 16 must be greater than or equal to 2 cm, and that the end section 8a of the microcapillary tube 8 inside part 10a of the vaporization microcannula 10 must have a length less than or equal to 5 mm.

The use of the chromatography nano-column 7 and the position requirements of the vaporization microcannula 10 with respect to the microcapillary tube 8 circumvent the need for having a device that removes part of the liquid phase coming from the liquid phase chromatograph 2 and ensure that the liquid phase gasifies in a correct manner without producing blockages inside the microcapillary tube 8.

In conclusion, the machine of the present invention ensures the possibility of vaporizing, without encountering the problems of the known art, the neutral substances already separated in liquid chromatography and, therefore, of being able to subject them to the action of an electronic ionization mass spectrometer, with obvious advantages in terms of analysis efficiency and low costs that this entails.

The invention claimed is:

1. A chemical analysis machine comprising a liquid phase chromatograph comprising, in turn, a chromatography nano-column with an inner diameter that is smaller than or equal to 100 μm, an electronic ionization mass spectrometer, and a joining assembly interposed between the liquid phase chromatograph and the electronic ionization mass spectrometer; said machine being characterized in that said joining assembly comprises a microcapillary tube having an inner diameter smaller than or equal to 50 μm and having a first end, which is directly connected to an outlet end of the nano-column so as to receive the liquid phase, and a second end, which is housed inside a vaporization microcannula within which an inert gas flows; said vaporization microcannula being partially engaged by said microcapillary tube and having an end facing the inside of an ionization chamber of said electronic ionization mass spectrometer; said vaporization microcannula being divided into a first part, which is subjected to the action of a heating device, adapted to heat said first part to a temperature ranging between 200 and 400° C., and a second part, which is kept at room temperature and has a length that is greater than or equal to 2 cm; said microcapillary tube occupying the inside of the entire second part of the vaporization microcannula and having an end portion that is arranged inside said first part and has a length that is less than or equal to 5 mm.

2. The chemical analysis machine according to claim 1, wherein it comprises a T-shaped device, which incorporates a longitudinal channel, through which, in use, the microcapillary tube passes, and a transverse channel, which is useful for the introduction of the inert gas into the longitudinal channel and has a first end facing onto the outside of the T-shaped device, and a second end facing the longitudinal channel.

3. The chemical analysis machine according to claim 1, wherein said heater has a central channel, which houses said part of the vaporization microcannula.

* * * * *